United States Patent
Lin et al.

(10) Patent No.: US 10,822,529 B2
(45) Date of Patent: Nov. 3, 2020

(54) MULTI-LAYERED ANISOTROPIC CONDUCTIVE ADHESIVE HAVING CONDUCTIVE FABRIC AND PREPARATION THEREOF

(71) Applicant: ASIA ELECTRONIC MATERIAL CO., LTD., Hsinchu County (TW)

(72) Inventors: Chih-Ming Lin, Zhubei (TW); Chien-Hui Lee, Zhubei (TW)

(73) Assignee: ASIA ELECTRONIC MATERIAL CO., LTD., Hsinchu County (TW)

(*) Notice: Subject to any disclaimer, the term of this patent is extended or adjusted under 35 U.S.C. 154(b) by 106 days.

(21) Appl. No.: 15/854,935

(22) Filed: Dec. 27, 2017

(65) Prior Publication Data

US 2018/0273809 A1    Sep. 27, 2018

(30) Foreign Application Priority Data

Mar. 27, 2017 (CN) .......................... 2017 1 0188042

(51) Int. Cl.
*C25D 5/12* (2006.01)
*C09J 7/28* (2018.01)
(Continued)

(52) U.S. Cl.
CPC .................. *C09J 7/385* (2018.01); *C09J 7/28* (2018.01); *C09J 7/29* (2018.01); *C09J 7/30* (2018.01);
(Continued)

(58) Field of Classification Search
CPC ............. Y10T 428/28; Y10T 428/2804; Y10T 428/2809; Y10T 428/2813;
(Continued)

(56) References Cited

U.S. PATENT DOCUMENTS

2003/0102466 A1* 6/2003 Kumakura ............... C09J 9/02
                                                         252/512
2006/0110600 A1* 5/2006 Connell ............... C09J 161/14
                                                         428/414
(Continued)

FOREIGN PATENT DOCUMENTS

CN          107914435 A    *  4/2018
KR        20160059059 A    *  5/2016
WO    WO-2015112532 A1    *  7/2015

OTHER PUBLICATIONS

Machine translation (Espacenet) of CN 107914435 A. Translated Jul. 17, 2020. (Year: 2020).*

(Continued)

*Primary Examiner* — Maria V Ewald
*Assistant Examiner* — Ethan A. Utt
(74) *Attorney, Agent, or Firm* — Amin, Turocy & Watson LLP

(57) ABSTRACT

The present disclosure provides a multi-layered anisotropic conductive adhesive including an upper conductive adhesive layer, a conductive fabric layer with two sides and a lower conductive adhesive layer, wherein one side of the conductive fabric layer is plated with metal, and the total thickness of the multi-layered anisotropic conductive adhesive is 45 to 100 μm. In the application of a flexible printed circuit, reinforced parts, formed by laminating multi-layered anisotropic conductive adhesive with steel or polyimide-type stiffener, can effectively prevent the deformation of installed parts due to warping, and ensure the good hole filling, good direct grounding effect, and good shielding performance. Therefore, the multi-layered anisotropic conductive adhesive of the present disclosure has good electrical properties, good adhesive strength, better tin soldering, reliability and flame resistant. The disclosure further provides a method of producing the multi-layered anisotropic conductive adhesive.

16 Claims, 1 Drawing Sheet

(51) Int. Cl.
*C09J 9/02* (2006.01)
*C09J 7/40* (2018.01)
*C09J 7/30* (2018.01)
*C09J 7/29* (2018.01)
*H01B 1/22* (2006.01)
*C08K 3/08* (2006.01)
*C08K 7/00* (2006.01)
*C09J 7/38* (2018.01)
*H01B 1/02* (2006.01)
*C25D 3/02* (2006.01)

(52) U.S. Cl.
CPC .............. *C09J 7/401* (2018.01); *C09J 9/02* (2013.01); *C25D 3/02* (2013.01); *C25D 5/12* (2013.01); *H01B 1/026* (2013.01); *H01B 1/22* (2013.01); *C08K 3/08* (2013.01); *C08K 7/00* (2013.01); *C08K 2201/001* (2013.01); *C09J 2201/128* (2013.01); *C09J 2201/36* (2013.01); *C09J 2201/602* (2013.01); *C09J 2201/606* (2013.01); *C09J 2203/326* (2013.01); *C09J 2205/102* (2013.01); *C09J 2400/163* (2013.01); *C09J 2400/263* (2013.01); *C09J 2433/00* (2013.01); *C09J 2467/005* (2013.01); *Y10T 428/1452* (2015.01); *Y10T 428/1476* (2015.01); *Y10T 428/24959* (2015.01); *Y10T 428/256* (2015.01); *Y10T 428/287* (2015.01); *Y10T 428/2852* (2015.01); *Y10T 428/2874* (2015.01); *Y10T 428/2891* (2015.01); *Y10T 428/2896* (2015.01)

(58) Field of Classification Search
CPC ......... Y10T 428/2839; Y10T 428/2848; Y10T 428/2852; Y10T 428/287; Y10T 428/2874; Y10T 428/2878; Y10T 428/2887; Y10T 428/2891; Y10T 428/2896; Y10T 428/14; Y10T 428/1405; Y10T 428/1438; Y10T 428/1443; Y10T 428/1452; Y10T 428/1457; Y10T 428/1462; Y10T 428/1476; Y10T 428/25; Y10T 428/256; Y10T 428/24942; Y10T 428/2495; Y10T 428/24959; Y10T 428/24967; Y10T 428/24975; Y10T 428/26; Y10T 428/263; Y10T 428/264; Y10T 428/265; Y10T 428/266; Y10T 428/269; Y10T 428/27; Y10T 428/273; Y10T 428/249962; Y10T 428/249964; Y10T 442/10; Y10T 442/102; Y10T 442/105; Y10T 442/109; Y10T 442/11; Y10T 442/112; Y10T 442/124; Y10T 442/126; Y10T 442/131; Y10T 442/133; Y10T 442/138; Y10T 442/145; Y10T 442/148; Y10T 442/152; Y10T 442/162; Y10T 442/164; Y10T 442/172; Y10T 442/174; Y10T 442/176; Y10T 442/184; Y10T 442/186; Y10T 442/188; Y10T 442/191; Y10T 44/198; Y10T 442/20; Y10T 442/2041; Y10T 442/2049; Y10T 442/2057; Y10T 442/2066; Y10T 442/2074; Y10T 442/2082; Y10T 442/209; Y10T 442/2098; Y10T 442/2107; Y10T 442/2115; Y10T 442/2123; Y10T 442/2131; Y10T 442/2418; Y10T 442/2738; Y10T 442/2746; Y10T 442/2754; Y10T 442/2926; Y10T 442/2951; Y10T 442/2959; Y10T 442/30; Y10T 442/3382; Y10T 442/339; Y10T 442/3398; Y10T 442/3407; Y10T 442/3854; Y10T 442/3862; Y10T 442/287; Y10T 442/2878; Y10T 442/2886; Y10T 442/3976; Y10T 442/60; Y10T 442/654; Y10T 442/655; Y10T 442/657; Y10T 442/658; Y10T 442/674; Y10T 442/675; Y10T 442/676; Y10T 442/677; Y10T 442/678; Y10T 442/696; Y10T 442/699; Y10T 428/31511; Y10T 428/31529; Y10T 428/31551; Y10T 428/31554; Y10T 428/31565; Y10T 428/31569; Y10T 428/31573; Y10T 428/3158; Y10T 428/31587; Y10T 428/31591; Y10T 428/31594; Y10T 428/31598; Y10T 428/31605; Y10T 428/31609; Y10T 428/31678; Y10T 428/31681; Y10T 428/31688; Y10T 428/31692; Y10T 428/31699; Y10T 428/31703; Y10T 428/31721; Y10T 428/31942; Y10T 428/31946; Y10T 442/198; B32B 7/00; B32B 7/04; B32B 7/12; B32B 2405/00; B32B 5/16; B32B 5/22; B32B 5/30; B32B 2264/105; B32B 2264/12; B32B 5/00; B32B 5/02; B32B 5/022; B32B 5/024; B32B 5/028; B32B 5/08; B32B 5/24; B32B 5/28; B32B 15/00; B32B 15/02; B32B 15/04; B32B 15/06; B32B 15/08; B32B 15/082; B32B 15/092; B32B 15/095; B32B 15/098; B32B 15/14; B32B 15/16; B32B 15/20; B32B 25/00; B32B 25/02; B32B 25/04; B32B 25/042; B32B 25/047; B32B 25/08; B32B 25/10; B32B 25/14; B32B 25/20; B32B 27/00; B32B 27/04; B32B 27/06; B32B 27/08; B32B 27/12; B32B 27/14; B32B 27/18; B32B 27/28; B32B 27/281; B32B 27/283; B32B 27/30; B32B 27/308; B32B 27/38; B32B 27/40; B32B 27/42; B32B 2262/103; B32B 2262/12; C09J 7/00; C09J 7/20; C09J 7/201; C09J 7/203; C09J 7/21; C09J 7/22; C09J 7/28; C09J 7/29; C09J 7/30; C09J 7/35; C09J 7/40; C09J 7/401; C09J 7/403; C09J 7/405; C09J 9/00; C09J 9/02; C09J 133/00; C09J 133/04; C09J 133/06; C09J 133/062; C09J 133/068; C09J 133/08; C09J 133/10; C09J 133/12; C09J 143/00; C09J 143/04; C09J 161/00; C09J 161/04; C09J 161/06; C09J 161/12; C09J 161/14; C09J 161/16; C09J 163/00; C09J 175/00; C09J 175/04; C09J 175/06; C09J 175/08; C09J 175/10; C09J 175/12; C09J 175/14; C09J 175/16; C09J 179/00; C09J 179/04; C09J 179/08; C09J 179/085; C09J 183/00; C09J 183/04; C09J 183/06; C09J 183/08; C09J 183/10; C09J 183/12; C09J 183/14; C09J 183/16; C09J 2205/102; C08K 3/08; C08K 2003/0806; C08K 2003/0831; C08K 2003/085; C08K 2003/0862; C08K 2201/001; C08K 2201/002; C08K 2201/003; C08K 2201/004; C08K 2201/005; C08K 2201/014; C08K 2201/016; H01B 1/00; H01B 1/02; H01B 1/20; H01B 1/22; H01B 5/00; H01B 5/14; H01B 5/16; D03D 1/00; D03D 1/0082; D03D 13/00; D03D 13/008; D03D 15/00; D03D 15/0005; D03D 15/0027; D04H 3/00; D04H 3/002

USPC ....... 428/343–346, 352, 354, 355 R, 355 EP, 428/355 AK, 355 EN, 355 CN, 355 AC, 428/355 N, 40.1, 40.2, 40.9, 41.1, 41.3, 428/41.4, 41.5, 41.8, 323, 328, 212–216, 428/219, 220, 332, 334–337, 339, 341, 428/311.11, 311.51, 413, 418, 423.1, 428/423.3, 423.7, 423.9, 424.2, 424.6, 428/424.8, 425.1, 425.3, 425.5, 425.8, 428/425.9, 446, 447, 450, 451, 452, 457, 428/458, 460, 461, 463, 464, 473.5, 524, 428/525; 252/500, 512–514; 442/1, 2, 4, 442/6–8, 15, 16, 19, 20, 23, 27, 29, 31, 442/37, 38, 43–45, 50–52, 54, 58, 59, 442/64–75, 110, 149–151, 172, 175, 176, 442/181, 228, 229–231, 286–290, 301, 442/327, 376, 377, 379, 380, 394–398, 442/414, 417

See application file for complete search history.

(56) References Cited

U.S. PATENT DOCUMENTS

| | | | |
|---|---|---|---|
| 2007/0116961 A1* | 5/2007 | Connell | C09J 7/10 428/413 |
| 2008/0020157 A1* | 1/2008 | Larson | C09J 179/08 428/35.5 |
| 2009/0095517 A1* | 4/2009 | Nonaka | C09J 9/02 174/259 |
| 2010/0276645 A1* | 11/2010 | Aspin | C09J 9/02 252/513 |
| 2012/0295052 A1* | 11/2012 | Choi | B32B 7/06 428/40.9 |
| 2014/0069698 A1* | 3/2014 | Choi | C09J 9/02 174/257 |

OTHER PUBLICATIONS

Machine translation (Espacenet) of KR 2016-0059059 A. Translated Oct. 29, 2019. (Year: 2019).*

* cited by examiner

MULTI-LAYERED ANISOTROPIC CONDUCTIVE ADHESIVE HAVING CONDUCTIVE FABRIC AND PREPARATION THEREOF

TECHNICAL FIELD

The present disclosure relates to conductive adhesives for printed circuit boards, especially to a multi-layered anisotropic conductive adhesive having conductive fabric.

BACKGROUND

As electric and communication products develop, circuit board elements have been developed towards lighter in weight, thinner in thickness, shorter in length, smaller in size, and higher in integration with broader and broader frequency band for signal transmission, resulting in more and more serious electromagnetic interference. In addition, application safety of electronic circuit elements has been taken into consideration, and new demands on reliability of ground connection of circuit elements in electronic products and variation of circuit board design arise. Currently, conductive adhesive products commonly sold often have the problem of delamination caused by the conductive adhesive overfilling grounding holes, influencing design and mounting of other elements. Alternatively, the defects of ineffective masking caused by that the conductive adhesive failing to completely fill, resulting in gaps in the connection parts during reflow soldering.

In addition, most of conductive adhesive products sold currently are formed by dispersing conductive particles in adhesive directly, and the adhesive layer is relatively thick. Therefore, non-uniform dispersion of particles will occur during adhesion of the products to a printed circuit board if curing is insufficient and adhesion is done under none-uniform pressure, thereby further affecting conductive properties.

Therefore, the present disclosure provides a highly conductive multi-layered anisotropic conductive adhesive consisting of a plurality of metal particles in multiple forms and a conductive fabric layer.

SUMMARY

For solving the technical problems, the present disclosure provides a multi-layered anisotropic conductive adhesive having conductive fabric, wherein the conductive adhesive has good electrical properties, adhesive strength, tin soldering, reliability and flame resistant, has better conductive effects and adhesive strength compared to common conductive adhesives, and is more easily produced with a prospect of a broad range of applications. In the view of a main application in a flexible printed circuit board, a reinforced assembly formed by adhering the multi-layered conductive adhesive to a steel sheet or a reinforced board made of polyimide can effectively prevent deformation at the mounting position due to bending, and ensure good hole filling, thereby having the effect of directly ground shielding external signal interference.

In order to solve the technical problem described above, the present disclosure provides multi-layered anisotropic conductive adhesive having conductive fabric, which includes: an upper conductive adhesive layer with a thickness of 20 to 40 μm; a lower conductive adhesive layer with a thickness of 20 to 40 μm, wherein both the upper conductive adhesive layer and the lower conductive adhesive layer include a plurality of metal conductive particles with particle sizes of 2 to 50 μm, and the plurality of metal conductive particles are in at least two shapes selected from the group consisting of dendritic, acicular, flaky and spherical forms; and a conductive fabric layer having an upper side and a lower side with a thickness of 5 to 30 μm, the conductive fabric layer being formed between the upper conductive adhesive layer and the lower conductive adhesive layer for the multi layered anisotropic conductive adhesive to have a total thickness of 40 to 60 μm wherein at least one side of the conductive fabric layer is plated with a metal layer.

In one embodiment, the plurality of metal conductive particles have particle sizes ina range of 5 to 45 μm.

In another embodiment, the plurality of metal conductive particles have particle sizes in a range of 10 to 45 μm.

In one embodiment, both the upper conductive adhesive layer and the lower conductive adhesive layer are thermosetting adhesive layers, each of which includes an adhesive resin and the plurality of metal conductive particles, wherein each of the upper conductive adhesive layer and the lower conductive adhesive layer contains the adhesive resin in an amount of 20 to 75% by weight, the plurality of metal conductive particles in an amount of 25 to 70% by weight, and the weight ratio of the plurality of metal conductive particles to the adhesive resin is from 1:1 to 4:1.

In one embodiment, the conductive fabric layer is fiber cloth, and the fiber cloth can be at least one selected from the group consisting of gridding cloth, plain weaving fabric and non-woven fabric, wherein the fiber cloth has a plurality of micropores having sizes allowing the smallest metal conductive particle in the upper conductive adhesive layer and the lower conductive adhesive layer to pass through the fiber cloth.

In another embodiment, each of the micropores in the conductive fabric layer has a size greater than or equal to 5 μm.

In one embodiment, the metal layer on the surface of the conductive fabric layer can be a copper nickel plating layer, a copper cobalt plating layer, a copper tin plating layer, a copper silver plating layer, a copper iron nickel plating layer, a copper gold plating layer or a copper plating layer.

In one embodiment, the plurality of metal conductive particles are formed by mixing a plurality of dendritic metal conductive particles with a plurality of acicular metal conductive particles and a plurality of flaky metal conductive particles, wherein the weight ratio of the plurality of dendritic metal conductive particles to the plurality of acicular metal conductive particles is from 1:5 to 5:1, and the weight ratio of the plurality of acicular metal conductive particles to the plurality of flaky metal conductive particles is from 1:4 to 4:1.

In one embodiment, the materials forming the plurality of metal conductive particles include conductive alloy particles.

In one embodiment, the adhesive resin is at least one selected from the group consisting of an epoxy resin, an acrylic resin, a urethane resin, a silicon rubber resin, a poly-p-xylene resin, a bismaleimide-based resin, a phenolic resin, a melamine resin, and a polyimide resin.

In one embodiment, two releasable layers each having a thickness of 25 to 100 μm are formed below the lower conductive adhesive layer and on the upper conductive adhesive layer, respectively, wherein each of the release layers can be a single-sided release film or a double-sided releasable film, and the release layers can be fluorine-coated polyester release films, silicone oil-coated polyester strippable films, matte polyester release films, polyethylene release films or polyethylene laminated paper layers.

The present disclosure further provides a method for preparing a multi-layered anisotropic conductive adhesive, which includes: mixing a plurality of metal conductive particles having particle sizes in a range of 2 to 22 μm with an adhesive resin at a weight ratio of 1:1 to 4:1 to form a mixture, wherein the plurality of metal conductive particles have at least two shapes selected from the group consisting of dentriticdendritic, acicular, flaky and spherical forms; coating the mixture on a specified release surface of the release layer to form a lower conductive adhesive layer; adhering the conductive fabric layer to the surface of the lower conductive adhesive layer; coating another mixture formed by mixing a plurality of metal conductive particles with particle sizes of 2 to 22 μm with an adhesive resin at a weight ratio of 1:1 to 4:1 onto the other side of the conductive fabric layer, so to form the upper conductive adhesive layer; and adhering a release layer to the surface of the upper conductive adhesive layer.

In one embodiment, the method further includes pre-curing the lower conductive adhesive layer after the conductive fabric layer is adhered, and pre-curing the upper conductive adhesive layer after adhering the release layer to the surface of the upper conductive adhesive layer.

In one embodiment, the mixture is identical to the other mixture.

In one embodiment, the method further includes a rolling step and a strip-forming step to give a product.

The present disclosure provides a multi-layered anisotropic conductive adhesive to have the upper conductive adhesive layer and the lower conductive adhesive layer including a plurality of metal conductive particles in at least two shapes. Thus, the plurality of metal conductive particles tend to flow in many directions due to the many shapes thereof, when deformations occur under thermal pressure during processing, resulting in multi-directional highly dispersed distribution of the plurality of metal conductive particles in the conductive adhesive layer after lamination. Thus, a conductive circuit is formed with the grounding holes in a flexible board for the upper conductive adhesive layer and the lower conductive adhesive layer to impart good anisotropic conductivity, thereby enhancing the conductive properties greatly and reducing grounding resistance value of the flexible board.

In addition, the fibrous or net structure of the conductive fabric layer of the present disclosure facilitates the plurality of metal conductive particles in the upper conductive adhesive layer and the lower conductive adhesive layer to pass through the micropores thereof, so as to achieve conduction between the upper and lower conductive adhesive layers. Meanwhile, no delamination will occur during surface adhesion process of a flexible printed circuit boards due to the good gas permeability of the conductive fabric layer, thereby effectively solving the problems of delamination of the current conductive adhesives and conductive adhesives with introduced metal layers.

By using fiber cloth as the substrate, the conductive fabric layer of the present disclosure has good flexibility and wearability to avoid deformation when the flexible circuit board is thermally pressed due to the high rigidity of the conductive adhesive, thereby avoiding influence on properties. Meanwhile, the plurality of metal conductive particles in the upper conductive adhesive layer and the lower conductive adhesive layer are thermally pressed to make the adhesive resin flow to achieve anisotropic conductivity, thereby effectively avoiding the disadvantages of low conductivity of conventional conductive adhesive and the conductive adhesive with introduced metal thin layer(s).

Further, since the surface of the conductive fabric layer of the present disclosure is electroplated with metal to form a metal layer, in the condition of the same conductivity, a relatively lower amount of the plurality of metal conductive particles can be used in the upper conductive adhesive layer and the lower conductive adhesive layer, thereby reducing dust pollution, decreasing cost, and greatly enhancing adhesive strength of the product.

Also, after curing and laminating at high temperature for a period, the anisotropic plurality of metal conductive particles can improve the adhesive resin to achieve the same electricity and mechanical property as those achieved after complete cross-linking and curing.

The external electromagnetic wave interference can also be effectively shielded, because of the good grounding stability when the conductive adhesive layer of the present disclosure and metal parts such as a steel board are covered and adhered onto a printed circuit board to form a reinforced part.

Additionally, the metal particles of the present disclosure contain a plurality of conductive alloy particles, which have excellent anti-oxidation and conductivity, and are beneficial for storage and delivery without affecting physical and chemical properties of the products. Therefore, the products have the properties of high stability and reliability.

The foregoing merely provides an overview on the technology of the present disclosure, and in order to allow a person to more clearly understand on the technical means of the present disclosure and to practice according to the content of the present specification, the present disclosure will be described in detail by following Examples accompanying the figures.

DETAILED DESCRIPTION OF THE EMBODIMENTS

The embodiments of the present disclosure will be illustrated by particular Examples described below, and anyone skilled in the art can easily understand the advantages and effects of the present disclosure based on the content of the present specification.

It should be noted that all of the structures, ratios, sizes and so on shown in the Figures are used for the purpose of illustration of the content of the present specification, which are provided for understanding and reading by anyone skilled in the art, rather than limit conditions for practicing the present disclosure. Therefore, they have no substantial meaning in technical view. Any modification of structure, alteration of proportion or adjustment of size, which has no influence on effects and purposes of the present disclosure, should fall within the scope encompassed by technical content described in the present disclosure. Meanwhile, words used herein such as "a", "an", "upper" and "lower" are merely used for clear description, not for limiting the implemental scope of the present disclosure. Thus, the alteration or adjustment on the relative relationship without any substantial change in the technical content should be considered as within the scope of the present disclosure.

In addition, all of ranges and values used herein are inclusive and combinable. Any value or point within the range described herein, such as any integer, can be used as the minimum or the maximum value to derive a subrange and the like.

Figure 1:
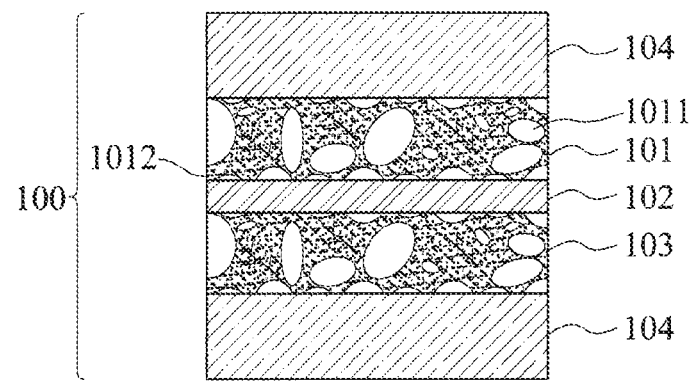
FIG. 1 is a schematic diagram showing the structure of the present disclosure.

Referencing to FIG. 1, a multi-layered anisotropic conductive adhesive 100 includes: an upper conductive adhesive layer 101 with a thickness of 20 to 40 µm; an lower conductive adhesive layer 103 with a thickness of 20 to 40 µm, wherein both the upper conductive adhesive layer and the lower conductive adhesive layer include a plurality of metal conductive particles 1011, and the plurality of metal conductive particles each has a size of 2 to 50 µm and contains metal conductive particles in at least two shapes selected from the group consisting of dendritic, acicular, flaky and spherical forms; and a conductive fabric layer 102 with a thickness of 5 to 30 µm and an upper side and a lower side, and is formed between the upper conductive adhesive layer 101 and the lower conductive adhesive layer 103, wherein at least one side of the conductive fabric layer is plated with a metal layer, and the multi layered anisotropic conductive adhesive has a total thickness of 40 to 60 µm.

The conductive fabric layer 102 has a thickness of 5 to 30 µm, which allows the conductive fabric layer to have excellent flexibility and wearability and improved reliability and shielding efficacy. The plurality of metal conductive particles in the upper conductive adhesive layer and the lower conductive adhesive layer cannot be in contact with one another if too thick, resulting in poor contact between the conductive particles in the upper layer and that in the lower layer; and production cost will be greatly increased if too thin.

The multi layered anisotropic conductive adhesive has a total thickness of 40 to 60 µm. The shielding effect will be poor if the conductive adhesive layer is too thin; and if the conductive adhesive layer is too thick, the requirement for a thinner product cannot be satisfied and it is not beneficial to coating processing, resulting in increased production cost.

Both of the upper conductive adhesive layer 101 and the lower conductive adhesive layer 103 are thermosetting adhesive layers, each of which includes an adhesive resin 1012 and the plurality of metal conductive particles, wherein each of the upper conductive adhesive layer and the lower conductive adhesive layer contains the adhesive resin in an amount of 20 to 75 wt % and the plurality of metal conductive particles in an amount of 25 to 70 wt %, and the weight ratio of the plurality of metal conductive particles to the adhesive resin is 1:1 to 4:1. The conductivity is poor if the ratio is lower than 1:1, and the high amount of adhesive will cause problem of easily generating a sticky board during subsequent operations. If the ratio is higher than 4:1, the proportion of the powder will be too high to dispense, and it can cause influences on the close adhesion and adhesive strength. In addition, the upper conductive adhesive layer and the lower conductive adhesive layer of the present disclosure further include some auxiliaries (e.g., hardener, thickener, and the like) and non-metal conductive particles (e.g., graphite, conductive compounds, and the like).

The viscosity will be too low if the adhesive resin is too little; and if the adhesive resin is too much, the product will be too viscous and the relative content of the plurality of metal conductive particles is decreased, resulting in poor conductivity.

In one embodiment, in each of the upper conductive adhesive layer and the lower conductive adhesive layer, the proportion of the plurality of metal conductive particles is 35 to 55 wt %.

The conductive fabric layer is fiber cloth, which is at least one selected from the group consisting of gridding cloth, plain woven cloth and non-woven cloth, wherein the fiber cloth has micropores each with a size larger than that of the smallest metal conductive particles in the upper conductive adhesive layer and the lower conductive adhesive layer to allow the metal conductive particles to pass through the fiber cloth.

In another embodiment, each of the micropores in the conductive fabric layer has a size greater than or equal to 5 µm.

The metal layer on the surface of the conductive fabric layer 102 can be a copper nickel plating layer, a copper cobalt plating layer, a copper tin plating layer, a copper silver plating layer, a copper iron nickel plating layer, a copper gold plating layer or a copper plating layer.

In one embodiment, the metal layer on the surface of the conductive fabric layer is a copper nickel plating layer or a copper silver plating layer.

In one embodiment, the plurality of metal conductive particles each has a size of 5 to 45 µm; in another embodiment, the plurality of metal conductive particles has a size of 10 to 45 µm; wherein the plurality of metal conductive particles are formed by mixing a plurality of dendritic metal conductive particles, a plurality of acicular metal conductive particles and a plurality of flaky metal conductive particles, the weight ratio of the plurality of dendritic metal conductive particles to the plurality of acicular metal conductive particles is 1:5 to 5:1, and the weight ratio of the plurality of acicular metal conductive particles to the plurality of flaky metal conductive particles is 1:4 to 4:1.

The materials for forming the plurality of metal conductive particles include at least one of single metal conductive particles and conductive alloy particles. In one embodiment, conductive alloy particles are preferable as the plurality of metal conductive particles.

Among these, the single metal conductive particles can be at least one selected from the group consisting of gold, silver, copper and nickel particles, but not limited thereto. The conductive alloy particles can be at least one selected from the group consisting of Ag—Cu plated particles, Ag—Au plated particles, Ag—Ni plated particles, Au—Cu plated particles and Au—Ni plated particles, but are not limited thereto.

The conductive alloy particles have good and conductivity, and the products thereof can be stored and delivered without affecting their physical properties, resulting in the properties of high stability and reliability of the products.

The adhesive resin is at least one selected from the group consisting of epoxy resins, acrylic resins, urethane resins, silicone rubber resins, poly-p-xylene resins, bismaleimide-based resins, phenolic resins, melamine resins, and polyimide resins. In one embodiment, the acrylic resins are particularly preferable.

Release layers 104 can each be formed under the lower conductive adhesive layer 103 and on the upper conductive adhesive layer 101, respectively, and it is not beneficial for subsequent die cutting if the release layers are too thick or too thin. The release layers can be single-sided release films or double-sided strippable films, and the release layers can be fluorine-coated polyester release films, silicone oil-coated polyester release films, matte polyester release films, polyethylene release films or polyethylene laminated paper layers.

The release films of the release layers are pure white, milk white or transparent. In one embodiment, a pure white or a milk white release layer is particularly preferable, since a pure white or milk white release film has no problem of light reflection under interaction with infrared ray when engraving a circuit using a digitally-controlled automatic equipment, thereby quickly and accurately achieving the location and operation. In addition, the pure white or milk white color can be recognized by a worker, thereby reducing the risk of leaving the release layer unstripped in the case of manual operation.

The present disclosure further provides a method for preparing the multi-layered anisotropic conductive adhesive, which includes:

Step I: screening the metal conductive particles in various shapes to obtain the particles with desired particle diameters, mixing the obtained metal conductive particles in various shapes uniformly to form a mixture consisting of a plurality of metal conductive particles, wherein the mixing can be performed by ball milling, and the milling rate should not be too high (preferably at a milling rate of 200 to 300 rpm), otherwise, the surface alloy layer of the metal particles will be destroyed. Alternatively, the mixing can be performed by stirring (preferably at a rate of 700 to 2,000 rpm), but mixing at a higher rate will give a plurality of metal conductive particles with the better mixing uniformity.

Step II: mixing the adhesive resin and the aforementioned mixture of a plurality of metal conductive particles thoroughly, while adding a mixture of a plurality of metal conductive particles, under the same mixing conditions as those in Step I.

Step III: coating the mixture obtained in Step II on the specified release surface of the release layer to form a lower conductive adhesive layer.

Step IV: adhering the lower conductive adhesive layer to a conductive fabric layer as support, pre-curing the lower conductive adhesive layer at a temperature which should not higher than the curing temperature of the adhesive resin itself, and the present disclosure employs a pre-curing temperature between 80°C. and 100°C., and removing the support after pre-curing to form the conductive fabric layer.

Step V: coating the mixture prepared in Step II on the other side of the thin metal layer to form an upper conductive adhesive layer. Of course, another mixture formulated in different composition and proportion can also be used.

Step VI: curing the upper conductive adhesive layer under the pre-curing conditions in Step IV, then rolling to give final products.

EXAMPLES

Test Method 1: Analysis on Conductivity

Figure 2:
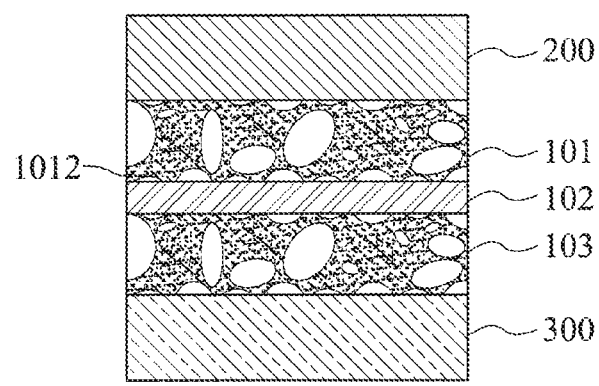
FIG. 2 is a schematic diagram showing conduction of a multi-layered anisotropic conductive adhesive of the present disclosure.

A conductivity test was performed on the multi-layered anisotropic conductive adhesive after removing the release film using a high bridge tester. As shown in FIG. 2, after pseudo-adhering a nickel steel plating sheet 200 and a printed circuit board 300 on the surface of the upper conductive adhesive layer 101 and the lower conductive adhesive layer 103 respectively, pressing (at a pressure of 100 kgw and a temperature of 180° C., pre-pressing for 10 sec and pressing for 120 sec) and curing (at a temperature of 160° C. for 1 hr), conductive resistance values of the sample before reflow soldering and after three times of reflow soldering were each examined. The present disclosure was taken as an Example and the test for electric conductivity of general products by the same method was taken as the Comparative Example, and the examined conductivity results are recorded in Table 1.

Heat resistance during soldering: after pseudo-adhering a nickel steel plating sheet 200 and a printed circuit board 300 on the surface of the upper conductive adhesive layer 101 and the lower conductive adhesive layer 103 respectively, pressing (at a pressure of 100 kgw and a temperature of 180° C., pre-pressing for 10 sec and pressing for 120 sec) and curing (at a temperature of 160° C. for 1 hr), the sample was placed in a high temperature soldering furnace where occurrences of phenomena including bubbles, streaks, melting, and the like were observed, with reference to the IPC-TM650 2.4.13 soldering test method.

Test Method 2: Analysis on Peeling Strength

Figure 3:
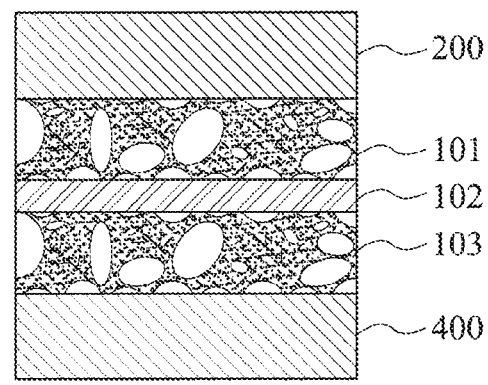
FIG. 3 is a schematic diagram showing a stripping force of the multi-layered anisotropic conductive adhesive of the present disclosure.

The multi-layered anisotropic conductive adhesive after the strippable films being removed was tested for its peeling strength using a universal tensile strength tester. As shown in FIG. 3, after pseudo-adhering a nickel steel plating sheet 200 and a single-sided copper coil-coated substrate 400 on the surface of the upper conductive adhesive layer and the lower conductive adhesive layer, respectively, pressing and curing, and obtaining the sample for a test for the peeling strength thereof. The present disclosure was taken as an Example and the test for peeling strength of general products by the same method was taken as the Comparative Example, and the tested conductivity results are recorded in Table 1.

Example 1: Preparation of a Multi-Layer Anisotropic Conductive Adhesive Having Conductive Fabric A mixture of metal particles in different shapes was prepared by screening powder of silver copper-plated spherical metal conductive particles and silver nickel plated acicular ones, both having D90 particle size of about 45 µm, and agitating and mixing the metal conductive particles described above under a ball milling condition of 250 rpm, wherein the weight ratio of the plurality of spherical metal particles to the plurality of acicular metal conductive particles was 1:1.

Thereafter, an acrylic adhesive resin (RD0351 and RD0352, manufactured by Asia Electronic Material Co., Ltd.) was added to the aforementioned mixture of metal particles in different shapes, then was mixed thoroughly under a ball milling condition of 250 rpm to form a uniform mixture while adding the mixture of metal particles in different shapes, so as to form a coating mixture consisting of 55% of the acrylic adhesive resin, 25% of the aforementioned mixture of metal particles in different shapes, and auxiliaries (RD0223 and RD0339, manufactured by Asia Electronic Material Co., Ltd.) in balance, wherein RD-0223 adjusted the intermolecular bonding force and dispersing uniformity of the adhesive resin, while RD-0339 adjusted the final viscosity of the adhesive resin mixture, and the addition ratio of RD-0223 to RD-0339 was 1:1.

The coating mixture was coated on a designated side of the fluorine-coated polyester release layer to form a lower conductive adhesive layer with a thickness of 20 µm, then the lower conductive adhesive layer was adhered onto a conductive fabric layer having a copper nickel plating layer as a support, pre-curing at a temperature of 80° C., and after the pre-curing was completely, the support was removed to form the conductive fabric layer with a thickness of 2 µm.

The upper conductive adhesive layer with the same composition as the lower conductive adhesive layer and with a thickness of 20 μm was formed on the other side of the conductive fabric layer by the same procedure of coating and pre-curing.

Physical properties of the multi-layered anisotropic conductive adhesive were tested and recorded in Table 1.

The preparation methods of multi-layered anisotropic conductive adhesives of Examples 2-5 and Comparative Examples 1-2 were the same as that of Example 1, except that the ratio of metal powder to adhesive resin, mixing weight ratio of metal powder, types of metal powder, kinds of metal layers of the conductive fabric, and the thicknesses of the upper and the lower conductive adhesive layers were altered as shown in Table 1. Physical properties of the multi-layered anisotropic conductive adhesives were tested and recorded in Table 1.

TABLE 1

| | Thickness of the upper conductive adhesive layer (μm) | Metal powder (wt %) | Adhesive resin (wt %) | Thickness of the conductive fabric layer (μm) | Type of the metal layer on the conductive fabric | Thickness of the lower conductive adhesive layer (μm) | Type of the metal conductive particles | Shapes of the metal conductive particles |
|---|---|---|---|---|---|---|---|---|
| Ex. 1 | 20 | 25 | 55 | 5 | Cu—Sn | 20 | Ag—Cu, Ag—Ni | spherical/acicular/ |
| Ex. 2 | 25 | 35 | 55 | 15 | Cu—Ag | 25 | Ag—Ni, Ag—Au | dendritic/acicular |
| Ex. 3 | 30 | 55 | 40 | 10 | Cu | 30 | Ag—Au, Ag—Cu | acicular/flaky |
| Ex. 4 | 40 | 50 | 40 | 20 | Cu—Sn | 40 | Ag, Ni | spherical/flaky |
| Ex. 5 | 25 | 70 | 20 | 30 | Cu—Co | 25 | Ni, Ag—Cu | flaky/spherical |
| Comp. Ex. 1 | 60 | 65 | — | — | — | — | — | — |
| Comp. Ex. 2 | 40 | 70 | — | — | — | — | — | — |

| | Weight ratio of the metal conductive particles | Resistance after baking (mOhm) | Resistance after three SMT (mOhm) | Thermal resistance to soldering tin | Peeling strength (kg weight/cm) |
|---|---|---|---|---|---|
| Ex. 1 | spherical:acicular = 1:1 | 86 | 75 | 320° C. 30 s passed | 2.45 |
| Ex. 2 | dendritic:acicular = 1:1 | 62 | 57 | 320° C. 15 s passed | 2.37 |
| Ex. 3 | acicular:flaky = 1:1 | 30 | 28 | 310° C. 60 s passed | 2.42 |
| Ex. 4 | spherical:flaky = 1:1 | 52 | 46 | 310° C. 60 s passed | 2.30 |
| Ex. 5 | flaky:spherical = 1:1 | 45 | 41 | 300° C. 60 s passed | 1.95 |
| Comp. Ex. 1 | — | 115 | 118 | 300° C. 30 s passed | 1.78 |
| Comp. Ex. 2 | — | 102 | 100 | 300° C. 30 s passed | 1.60 |

In Table 1, the upper conductive adhesive layer and the lower conductive adhesive layer have the same composition.

It can be seen from the above Table 1 that, the multi-layered anisotropic conductive adhesive has good conductive effects and thermal resistance tin soldering, as well as good adhesive strength.

The above Examples are provided for purpose of illustration only, and are not intended to limit the present disclosure. Anyone skilled in the art can make modification and alteration on above Examples without departing from the spirits and scope of the present disclosure. Thus, the scope the present disclosure is defined by accompanying claims, and should be encompassed in the technical content disclosed in the present disclosure, as long as it has no influence on the effects and purpose of the present disclosure.

What is claimed is:

1. A multi-layered anisotropic conductive adhesive, comprising:
    an upper conductive adhesive layer having a thickness of from 20 μm to 40 μm;
    a lower conductive adhesive layer having a thickness of from 20 μm to 40 μm, wherein the upper conductive adhesive layer and the lower conductive adhesive layer each comprise a plurality of metal conductive particles having particle sizes in a range of form 2 μm to 50 μm, and wherein the plurality of metal conductive particles are composed of a mixture including a plurality of dendritic metal conductive particles, a plurality of acicular metal conductive particles and a plurality of flaky metal conductive particles, and a weight ratio of the plurality of dendritic metal conductive particles to the plurality of acicular metal conductive particles is from 1:5 to 5:1, a weight ratio of the plurality of acicular metal conductive particles to the plurality of flaky metal conductive particles is from 1:4 to 4:1;
    a conductive fabric layer having an upper side and a lower side with a thickness of from 5 μm to 30 μm, the conductive fabric layer being formed between the upper conductive adhesive layer and the lower conductive adhesive layer for the multi-layered anisotropic conductive adhesive to have a total thickness of 40 μm to 60 μm; and a metal layer coated on at least one of the upper side and the lower side of the conductive fabric layer.

2. The multi-layered anisotropic conductive adhesive of claim 1, wherein the plurality of metal conductive particles are in an amount of from 25 wt% to 70 wt% in each of the upper conductive adhesive layer and the lower conductive adhesive layer.

3. The multi-layered anisotropic conductive adhesive of claim 1, wherein the upper conductive adhesive layer and the lower conductive adhesive layer are composed of thermosetting adhesive.

4. The multi-layered anisotropic conductive adhesive of claim 3, wherein the adhesive resin is in an amount of from 20 wt% to 75 wt% in each of the upper conductive adhesive layer and the lower conductive adhesive layer.

5. The multi-layered anisotropic conductive adhesive of claim 3, wherein a weight ratio of the plurality of metal conductive particles to the adhesive resin is from 1:1 to 4:1.

6. The multi-layered anisotropic conductive adhesive of claim 3, wherein the adhesive resin is at least one selected from the group consisting of an epoxy resin, an acrylic resin, a urethane resin, a silicone rubber resin, a poly-p-xylene resin, a bismaleimide-based resin, a phenolic resin, a melamine resin, and a polyimide resin.

7. The multi-layered anisotropic conductive adhesive of claim 1, wherein the conductive fabric layer is composed of fiber cloth selected from the group consisting of gridding cloth, plain weaving fabrics and non-woven fabrics.

8. The multi-layered anisotropic conductive adhesive of claim 7, wherein the fiber cloth has a plurality of micropores having sizes allowing for the smallest one of the metal conductive particles in the upper conductive adhesive layer and the lower conductive adhesive layer to pass therethrough.

9. The multi-layered anisotropic conductive adhesive of claim 1, wherein the metal layer on the conductive fabric layer is a copper nickel plating layer, a copper cobalt plating layer, a copper tin plating layer, a copper silver plating layer, a copper iron nickel plating layer, a copper gold plating layer or a copper plating layer.

10. The multi-layered anisotropic conductive adhesive of claim 1, wherein the particle sizes of the plurality of metal conductive particles are in a range of from 5 µm to 45 µm.

11. The multi-layered anisotropic conductive adhesive of claim 1, wherein the plurality of metal conductive particles are composed of a material comprising conductive alloy particles.

12. The multi-layered anisotropic conductive adhesive of claim 1, further comprising two release layers formed below the lower conductive adhesive layer and on the upper conductive adhesive layer, respectively.

13. The multi-layered anisotropic conductive adhesive of claim 12, wherein the release layers are each a single-sided release film or a double-sided release film, and at least one of the release layers is a fluorine-coated polyester release film, a silicone oil-coated polyester release film, a matte polyester strippable film, a polyethylene release film or a polyethylene laminated paper layer.

14. A method for preparing the multi-layered anisotropic conductive adhesive of claim 1, comprising:
mixing the plurality of metal conductive particles, the plurality of metal conductive particles having particle sizes in a range of from 2 µm to 22 µm, with an adhesive resin at a weight ratio of from 1:1 to 4:1 to form a mixture;
coating the mixture on a specified release surface of a release layer to form the lower conductive adhesive layer;
adhering the conductive fabric layer with the metal layer coated on at least one of the upper side and the lower side thereof to a surface of the lower conductive adhesive layer;
coating another mixture formed by mixing the plurality of metal particles having particle sizes in a range of from 2 µm to 22 µm with the adhesive resin at a weight ratio of form 1:1 to 4:1 onto the other side of the conductive fabric layer to form the upper conductive adhesive layer; and
adhering the release layer to a surface of the upper conductive adhesive layer.

15. The method of claim 14, further comprising pre-curing the lower conductive adhesive layer after adhering the conductive fabric layer to the surface of the lower conductive adhesive layer, and pre-curing the upper conductive adhesive layer after adhering the release layer to the surface of the upper conductive adhesive layer.

16. The method of claim 14, wherein the mixture is identical to the another mixture.

* * * * *